United States Patent
Parkins

(10) Patent No.: US 6,390,744 B1
(45) Date of Patent: May 21, 2002

(54) TIE DOWN ANCHOR

(76) Inventor: Todd Parkins, 99 Elgin Pkwy. NE., #44, Fort Walton Beach, FL (US) 32548

( * ) Notice: Subject to any disclaimer, the term of this patent is extended or adjusted under 35 U.S.C. 154(b) by 0 days.

(21) Appl. No.: 09/851,209

(22) Filed: May 7, 2001

(51) Int. Cl.[7] ............................................. B60P 7/08
(52) U.S. Cl. ........................ 410/106; 410/102; 410/107; 410/110; 410/111
(58) Field of Search .................. 410/102, 106, 410/107, 110, 111, 116; 24/115 K, 265 CD; 248/499

(56) References Cited

U.S. PATENT DOCUMENTS

| | | | | |
|---|---|---|---|---|
| 4,191,108 A | * | 3/1980 | Jones ........................ | 410/110 |
| 4,199,127 A | | 4/1980 | Osborn | |
| 4,650,382 A | | 3/1987 | Johnson ..................... | 410/110 |
| 4,850,769 A | * | 7/1989 | Matthews ................... | 410/105 |
| 4,850,770 A | * | 7/1989 | Miller, Jr. .................. | 410/110 |
| 5,180,263 A | | 1/1993 | Flowers, Jr. ............... | 410/106 |
| 5,443,341 A | * | 8/1995 | Hamilton .................... | 410/116 |
| 5,553,981 A | | 9/1996 | Bruden ....................... | 410/116 |
| 5,676,508 A | | 10/1997 | Weicht ........................ | 410/101 |
| 5,738,471 A | * | 4/1998 | Zentner et al. ............. | 410/110 |
| 5,915,900 A | * | 6/1999 | Boltz ........................... | 410/110 |
| 6,039,520 A | * | 3/2000 | Cheng ......................... | 410/106 |
| 6,050,763 A | * | 4/2000 | Swailes ....................... | 410/107 |

* cited by examiner

*Primary Examiner*—Stephen T. Gordon
(74) *Attorney, Agent, or Firm*—Peter Loffler

(57) ABSTRACT

A tie down anchor is attachable to the tailgate of a pickup truck for securement of a cargo strap thereto, the anchor having a plate member that has a first face that abuts the inner face of the tailgate and a second face. A first opening is disposed within the plate member while a pair of channel members extend outwardly from the first face of the plate member in generally parallel fashion, each channel having a pair second openings disposed therein. A leg member having at least two sections disposed on different planes is slidably disposed within the pair of channels while a pair of studs are each received within one of the pair of second openings and an opening located on the leg member and registerable with the pair of second openings for securing the leg member within the channels.

23 Claims, 4 Drawing Sheets

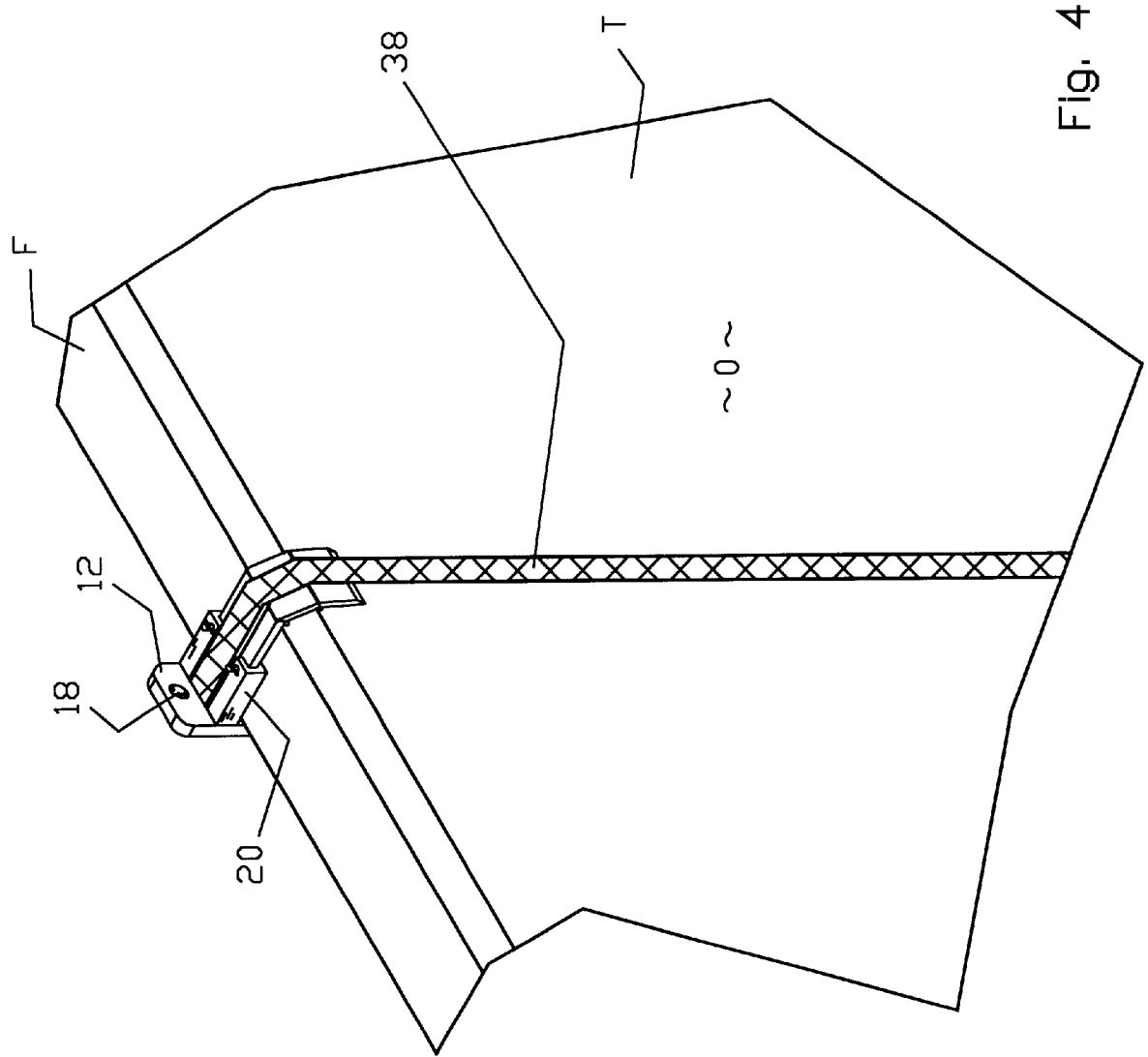

TIE DOWN ANCHOR

BACKGROUND OF THE INVENTION

1. Field of the Invention

The present invention relates to a tie down anchor that is secured to the tailgate of a pickup truck and allows a securement strap to be attached thereto.

2. Background of the Prior Art

Securing a load within a pickup truck can prove to be very tricky with some cargoes. The cargo is placed within the bed of the pickup truck and is secured thereto by passing a tie down cord around the cargo and securing the cord to various tie down hooks that are positioned along the sides of the pickup truck bed. This arrangement works satisfactorily for many types of cargo but is often insufficient for many types of items to be transported by the pickup truck. Items that are large and bulky, items that have a large surface area that tends to rise with increased air encounter, and oddly shaped items all pose problems in transporting such items by a pickup truck using standard tie down methods.

In order to effectively tie down and transport such difficult items, it is necessary to secure the cargo to the pickup truck at points other than along the sides of the pickup truck bed. Specifically, it is desirable to secure the cargo to one or more points along the tailgate of the pickup truck which gives multiple axis of securement of the cargo and gives a superior tie down arrangement.

Most pickup truck tail gates lack a tie down hook or other appropriate attachment point, making the securement of the cargo thereto difficult. In order to address this lack of securement hooks along the tailgate, devices have be proposed that provide the necessary tie down anchor that allow the cargo to be secured to points along the tailgate. Unfortunately, the prior art devices that provide a tie down anchor along the tailgate suffer from one or more drawbacks.

Many devices are complex in design and use making these devices cost prohibitive and relatively unattractive to buy and use. Other devices are pickup truck model specific, thereby lacking the desired universality of use expected of such devices. Still other devices require a permanent alteration to the pickup truck which many owners are unwilling to make.

Therefore, there exists a needs in the art for a tie down anchor that is securable to the tailgate of a pickup truck in order to allow securement of a cargo to a point along the tailgate of the pickup truck which overcomes the above-stated drawbacks in the art. Specifically, the tie down anchor must be relative simple in design and construction so that the anchor is relatively inexpensive to manufacture and does not deter usage because of design complexity. The tie down anchor must have near universal usage ability so that the device can be used on a wide variety of pickup truck tailgates. The tie down anchor should not require for a permanent alteration to be made to the pickup truck for tie down anchor usage.

SUMMARY OF THE INVENTION

The tie down anchor of the present invention addresses the aforementioned needs in the art. The tie down anchor is securable to the tailgate of a pickup truck and allows securement of a cargo to the tailgate of the pickup truck. The tie down anchor of the present invention is of relatively simple design and construction making the anchor relatively inexpensive to manufacture and the anchor does not deter usage by design complexity. The tie down anchor posses near universal usage ability so that the device can be used on a wide variety of pickup truck tailgates. The tie down anchor does not require a permanent alteration to be made to the pickup truck for tie down anchor usage.

The tie down anchor of the present invention is comprised of a plate member having a first face and a second face. A first opening is disposed within the plate member while a pair of channel members extend outwardly from the first face of the plate member in generally parallel fashion, each channel member having a pair of second openings disposed therein. A leg member has a first section disposed on a first plane, the leg member being slidably disposed within the pair of channels and has a second section disposed on a second plane that is different from the first plane. A pair of studs are provided such that each stud is received within one of the second openings and engages the first portion of the leg member for securement of the leg member within the pair of channels. A third opening may be disposed within the plate member between the pair of channel members while a strap passes through the third opening and encompasses the tailgate of the pickup truck. A first non-skuff material is secured to the first face of the plate member while a second non-skuff material secured to the second section of the leg member. The leg member may have a third section disposed on a third plane that is different than the first plane and is different than the second plane such that the second section connects the first section with the third section. A third non-skuff material may be secured to the third section of the leg member. The first face of the plate member abuts the inner face of the tailgate of the pickup truck, the pair of channel members abut the top face of the tailgate, and the second section or the third section of the leg member abuts the outer face of the tailgate.

BRIEF DESCRIPTION OF THE DRAWINGS

FIG. 4 is an environmental view of the tie down anchor installed on a pickup truck.

Similar reference numerals refer to similar parts throughout the several views of the drawings.

DESCRIPTION OF THE PREFERRED EMBODIMENT

Figure 1:
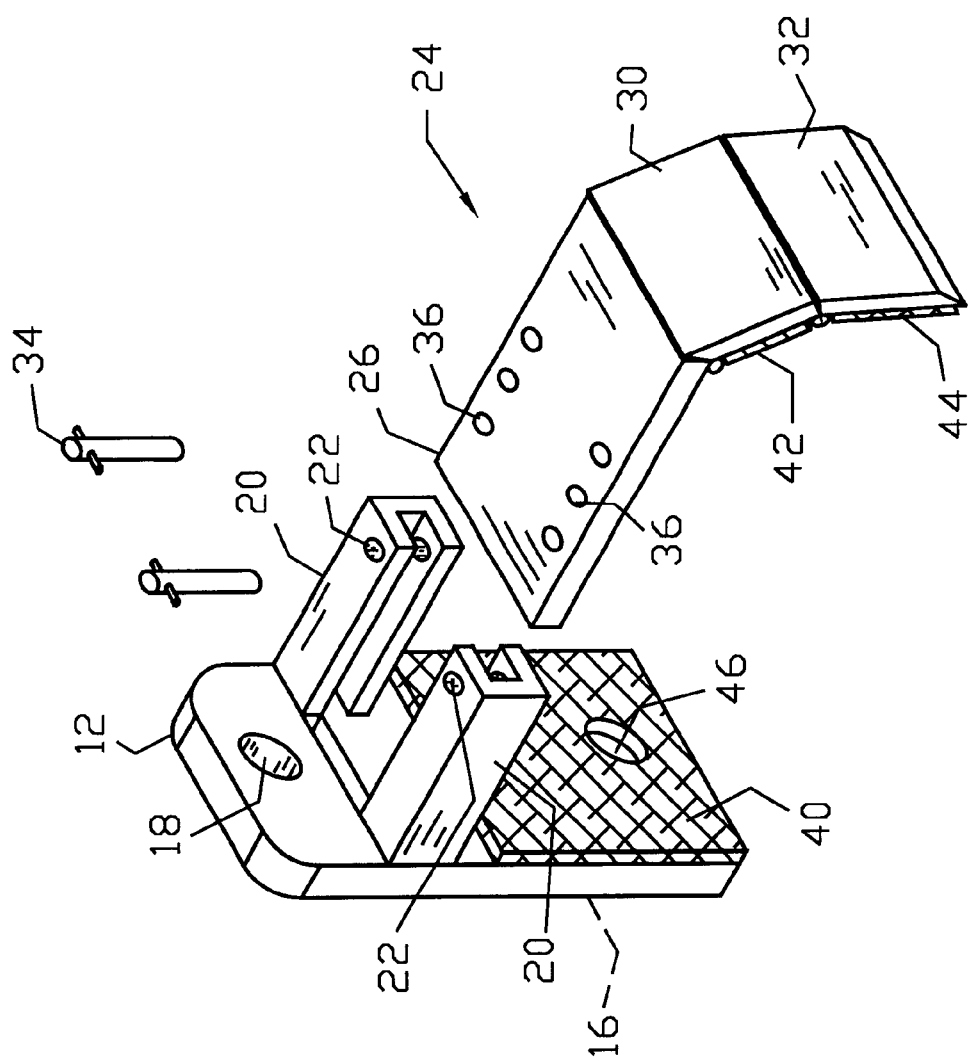
FIG. 1 is a perspective view of the tie down anchor of the present invention
Figure 2:
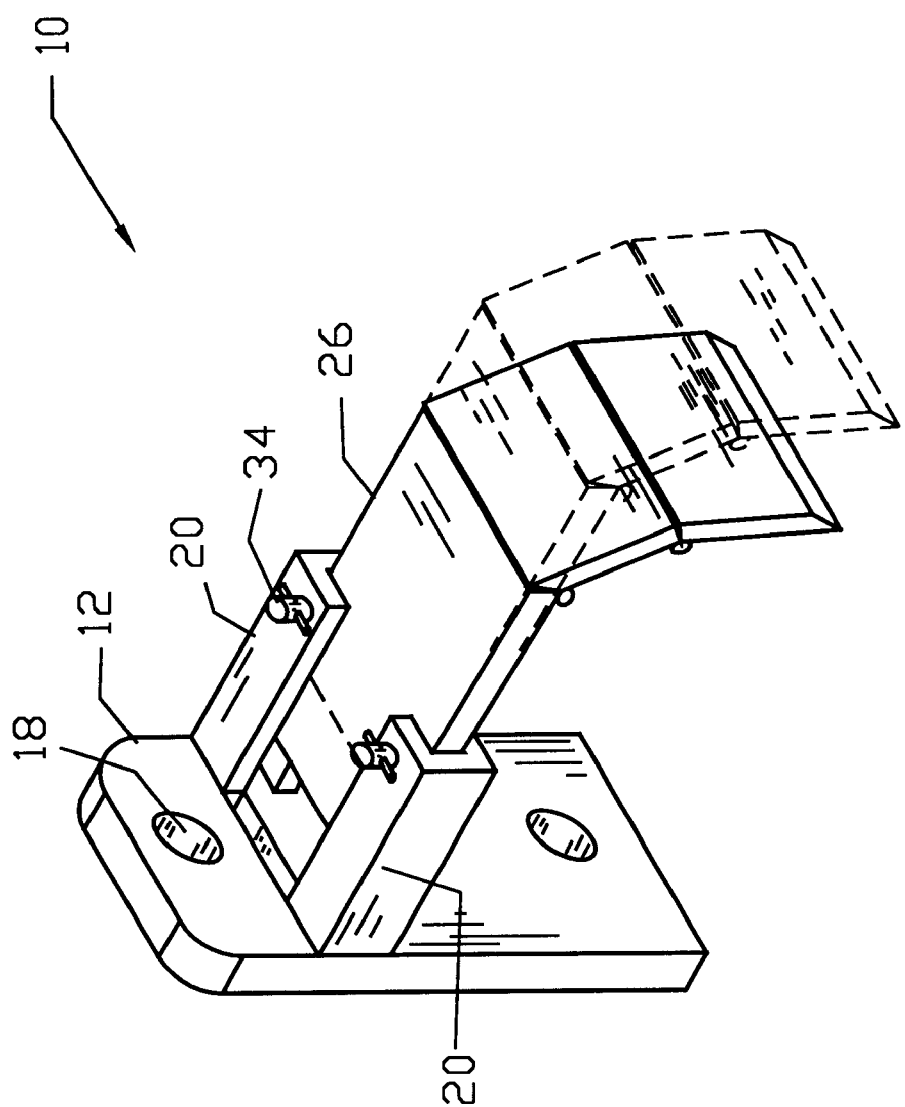
FIG. 2 is a perspective view of the tie down anchor illustrating a partial range of articulation of the leg member with respect tot he plate member.
Figure 3:
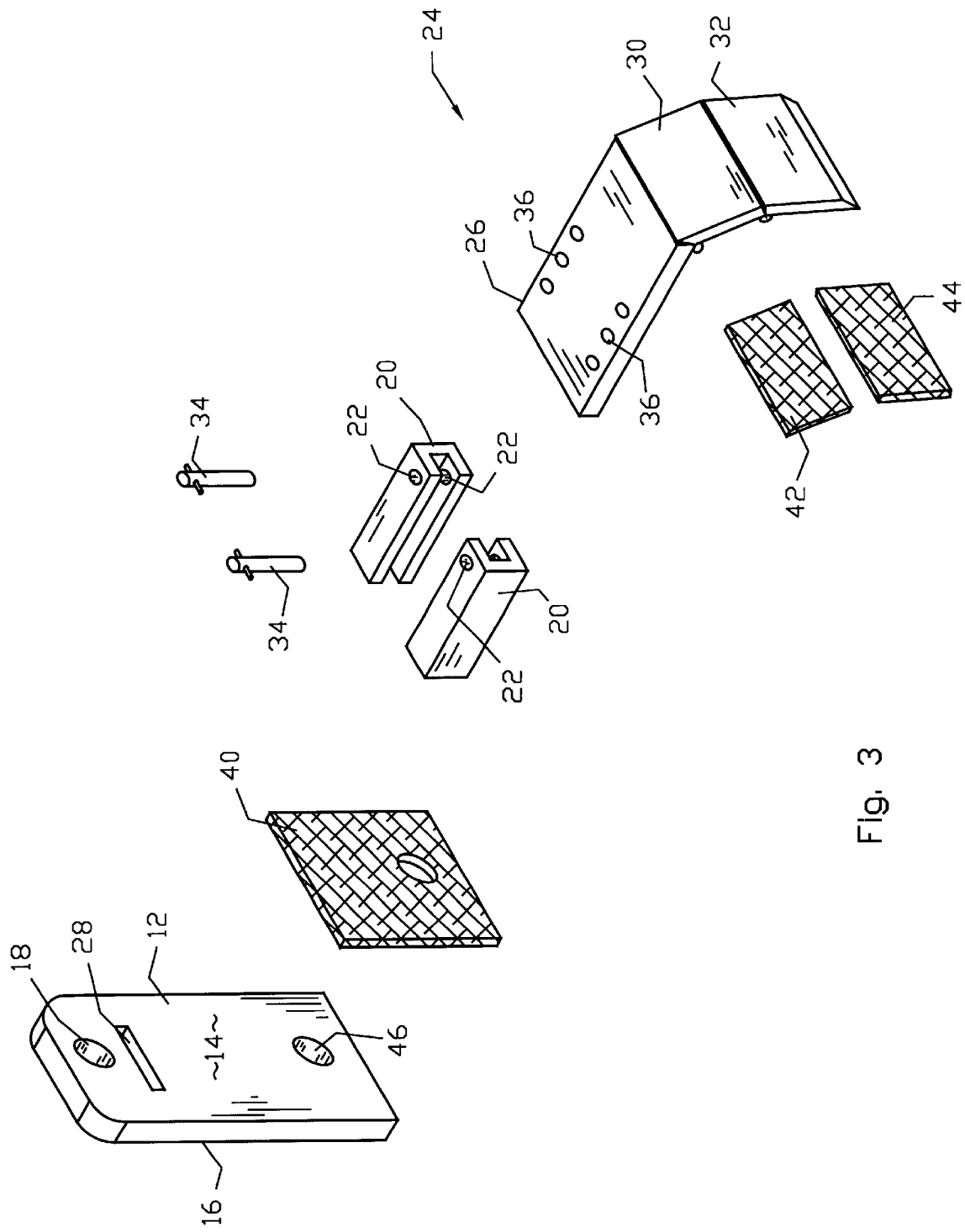
FIG. 3 is an exploded view of the tie down anchor.

Referring now to the drawings, it is seen that the tie down anchor of the present invention, generally denoted by reference numeral 10, is comprised of comprised of a plate member 12 having a first face 14 and a second face 16. The plate member 12 is made from any appropriate rigid material such as metal, plastic, etc. A first opening 18 is disposed within the plate member 12 while a pair of channel members 20 extend outwardly from the first face 14 of the plate member 12 in generally parallel fashion, each channel member 20 having a pair of second openings 22 disposed therein.

A leg member 24 has a first section 26 disposed on a first plane, the first section 26 of the leg member 24 being slidably disposed within the pair of channels 20 and can slide through a third opening 28 disposed on the plate member 12 between the pair of channel members 20. The leg member 24 has a second section 30 disposed on a second plane that is different from the first plane. The leg member 24 may have a third section 32 disposed on a third plane that is different than the first plane and is different than the second plane such that the second section 30 connects the first section 26 with the third section 32. The leg member 24 is made from any appropriate rigid material such as metal, plastic, etc. A pair of studs 34 are provided such that each stud 34 is received within one of the pair of second openings 22 and also passes through a fourth opening 36 disposed on the first portion 26 of the leg member 24 and registerable with the second openings 22 for securement of the leg member 24 within the pair of channels 20. A plurality of fourth openings 36 can be located along each side of the first section 26 of the leg member 24 or the fourth opening 36 can be drilled into the first section 26 of the leg member 24 for the particular tailgate T onto which the device 10 is to be secured. A strap 38 can pass through the third opening 28 and encompasses the tailgate T of the pickup truck.

A first non-skuff material 40 is secured to the first face 14 of the plate member 12 while a second non-skuff material 42 is secured to the second section 30 of the leg member 24. A third non-skuff material 44 may be secured to the third section 32 of the leg member 24.

In order to use the tie down anchor 10 of the present invention, the plate member 12 is positioned such that its first face 14 abuts the inner face of the tailgate T of the pickup truck and the pair of channel members 20 rest on the top face F of the tailgate T. The leg member 24 is positioned such that the first section 26 is received within the pair of channel members 20 and the second section 30 or the third section 32 of the leg member 24 abuts the outer face O of the tailgate T, depending on the particular geometry of the outer face O. Once the plate member 12 and the leg member 24 are positioned so as to have a firm hold on the tailgate T, the studs 34 are passed through their respective second openings 22 and fourth opening 36 (if not pre-drilled, the fourth openings 36 are drilled at this time) so as to hold the leg member 24 fixedly in place. Now the tie down anchor 10 can be used to help secure a cargo within the pickup truck bed by passing an appropriate tie down cord (not illustrated) through the first opening 18 located on the plate member 12. If needed, especially if securing an unusually heavy or bulky load, the strap 38 can be passed through the third opening 28 of the plate member 12, such that the strap 38 encompasses the tailgate T and is secured onto itself in any appropriate fashion.

The non-skuff members 40, 42, and 44 located on the first face 16 of the plate member 12, the second section 30 of the leg member 24 and the third section 32 of the leg member 24 respectively, assure that the finish on the tailgate T is not harmed by the tie down anchor 10 even if the anchor 10 moves or shifts during use.

If desired a fifth opening 46 can be located on the plate member 12 so that a bolt can pass therethrough and into the tailgate T for fixedly securing the tie down anchor 10 to the tailgate T.

While the invention has been particularly shown and described with reference to an embodiment thereof, it will be appreciated by those skilled in the art that various changes in form and detail may be made without departing from the spirit and scope of the invention.

I claim:

1. A tie down anchor comprising:
   a plate member having a first face and a second face;
   a first opening disposed within the plate member;
   a pair of channel members extending outwardly from the first face of the plate member in generally parallel fashion, each channel member having a pair of second openings disposed therein;
   a leg member has a first section disposed on a first plane and slidably disposed within the pair of channel members, the first section having a pair of third openings, and the leg member has a second section disposed on a second plane that is different from the first plane; and
   a pair of studs, each stud received within one of the pair of second openings of one of the pair of channel members and an aligned one of the third openings of the first section of the leg member.

2. The tie down anchor as in claim 1 further comprising a fourth opening disposed within the plate member between the pair of channel members.

3. The tie down anchor as in claim 2 further comprising a strap passing through the fourth opening.

4. The tie down anchor as in claim 1 further comprising a first non-skuff material secured to the first face of the plate member.

5. The tie down anchor as in claim 4 further comprising a second non-skuff material secured to the second section of the leg member.

6. The tie down anchor as in claim 5 further wherein the leg member has a third section disposed on a third plane that is different than the first plane and is different than the second plane.

7. The tie down anchor as in claim 6 further comprising a third non-skuff material secured to the third section of the leg member.

8. The tie down anchor as in claim 6 wherein the second section connects the first section with the third section.

9. The tie down anchor as in claim 1 further wherein the leg member has a third section disposed on a third plane that is different than the first plane and is different than the second plane.

10. The tie down anchor as in claim 9 wherein the second section connects the first section with the third section.

11. The tie down anchor as in claim 1 in combination with a pickup truck, the pickup truck having a tailgate with an inner face, a top face, and an outer face such that the first face of the plate member abuts the inner face, the pair of channel members abut the top face, and the second section of the leg member abuts the outer face.

12. A tie down anchor, in combination with a pickup truck, the pickup truck having a tailgate with an inner face, a top face, and an outer face, the tie down anchor comprising:
   a plate member having a first face and a second face, a first opening and a pair of channel members extending outwardly from the first face of the plate member in generally parallel fashion, each channel member having a pair of second openings disposed therein, such that the first face of the plate member abuts the inner face of the tailgate, and the pair of channel members abut the top face of the tailgate;
   a leg member having a first section disposed on a first plane and slidably disposed within the pair of channel members, the first section having a a pair of third openings, and the leg member having a second section disposed on a second plane that is different from the first plane, the second section abuts the outer face of the tailgate; and
   a pair of studs, each stud received within one of the pair of second openings of one of the pair of channel members and an aligned one of the third openings of the first section of the leg member.

13. The tie down anchor as in claim 12 further comprising a fourth opening disposed within the plate member between the pair of channel members.

14. The tie down anchor as in claim 13 further comprising a strap passing through the fourth opening and encompassing the tailgate.

15. The tie down anchor as in claim 12 further comprising a first non-skuff material secured to the first face of the plate member.

16. The tie down anchor as in claim 15 further comprising a second non-skuff material secured to the second section of the leg member.

17. A tie down anchor, in combination with a pickup truck, the pickup truck having a tailgate with an inner face, a top face, and an outer face, the tie down anchor comprising:

a plate member having a first face and a second face, a first opening and a pair of channel members extending outwardly from the first face of the plate member in generally parallel fashion, each channel member having a pair of second openings disposed therein, such that the first face of the plate member abuts the inner face of the tailgate, and the pair of channel members abut the top face of the tailgate;

a leg member has a first section disposed on a first plane and slidably disposed within the pair of channel members, the first section having a pair of third openings, the leg member having a second section disposed on a second plane that is different from the first plane, and has a third section disposed on a third plane that is different than the, first plane and is different than the second plane, the third section abuts the outer face of the tailgate; and a pair of studs, each stud received within one of the pair of second openings of one of the pair of channel members and an aligned one of the third openings of the first section of the leg member.

18. The tie down anchor as in claim 17 further comprising a fourth opening disposed within the plate member between the pair of channel members.

19. The tie down anchor as in claim 18 further comprising a strap passing through the fourth opening and encompassing the tailgate.

20. The tie down anchor as in claim 17 further comprising a first non-skuff material secured to the first face of the plate member.

21. The tie down anchor as in claim 20 further comprising a second non-skuff material secured to the second section of the leg member.

22. The tie down anchor as in claim 21 further comprising a third non-skuff material secured to the third section of the leg member.

23. The tie down anchor as in claim 17 wherein the second section connects the first section with the third section.

\* \* \* \* \*